United States Patent [19]

Kunz

[11] Patent Number: 4,887,926

[45] Date of Patent: Dec. 19, 1989

[54] TORQUE TRANSMITTING COUPLING FOR REELS AND THE LIKE

[75] Inventor: Udo Kunz, Dornhaldenstrasse 16, D-7850 Lörrach-Hauingen, Fed. Rep. of Germany

[73] Assignee: Udo Kunz, Lorrach-Hauingen, Fed. Rep. of Germany

[21] Appl. No.: 272,235

[22] Filed: Nov. 16, 1988

[30] Foreign Application Priority Data

Jun. 30, 1988 [DE] Fed. Rep. of Germany ....... 3822106

[51] Int. Cl.[4] ................................................. B25G 3/00
[52] U.S. Cl. ...................... 403/27; 403/341; 403/286; 464/182; 242/68.4
[58] Field of Search ................ 403/26, 341, 354, 355, 403/353, 286, 27; 464/106, 182, 185; 242/68.4, 68.1

[56] References Cited

U.S. PATENT DOCUMENTS

| | | | |
|---|---|---|---|
| 4,344,304 | 8/1982 | Eiche | 464/85 |
| 4,362,412 | 12/1982 | Kunz | 403/11 |
| 4,406,029 | 9/1983 | Kunz | 15/77 |
| 4,460,134 | 7/1984 | Kunz | 242/68.4 |
| 4,551,117 | 11/1985 | Kunz | 464/106 |
| 4,681,478 | 7/1987 | Kunz | 403/341 |
| 4,758,113 | 7/1988 | Kunz | 403/341 |

FOREIGN PATENT DOCUMENTS 917592 9/1954 Fed. Rep. of Germany .

Primary Examiner—Andrew V. Kundrat
Attorney, Agent, or Firm—Peter K. Kontler

[57] ABSTRACT

A coupling which serves to transmit torque from a shaft to the end portion of a rotary mandrel in a web winding or unwinding machine has a socket which is defined by a sleeve-like insert in the end portion of the shaft. The socket has a lateral inlet which can be closed by a pivotable gate, and the gate can be held in closed position by a wheel which is pivotable on the end portion of the shaft between operative and inoperative positions. The sleeve and the gate extend beyond one axial end of the wheel to define a relatively long socket for the end portion of the mandrel so that the latter can stand pronounced bending and other stresses.

39 Claims, 5 Drawing Sheets

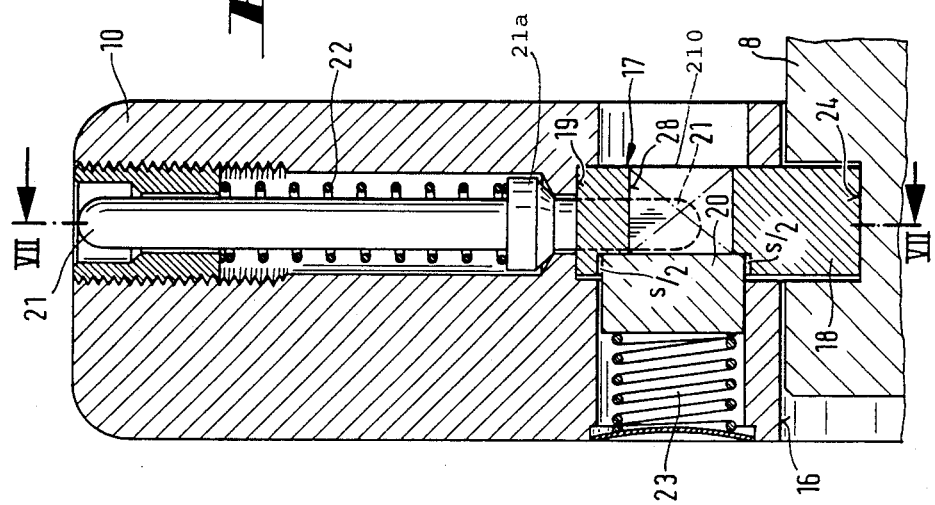
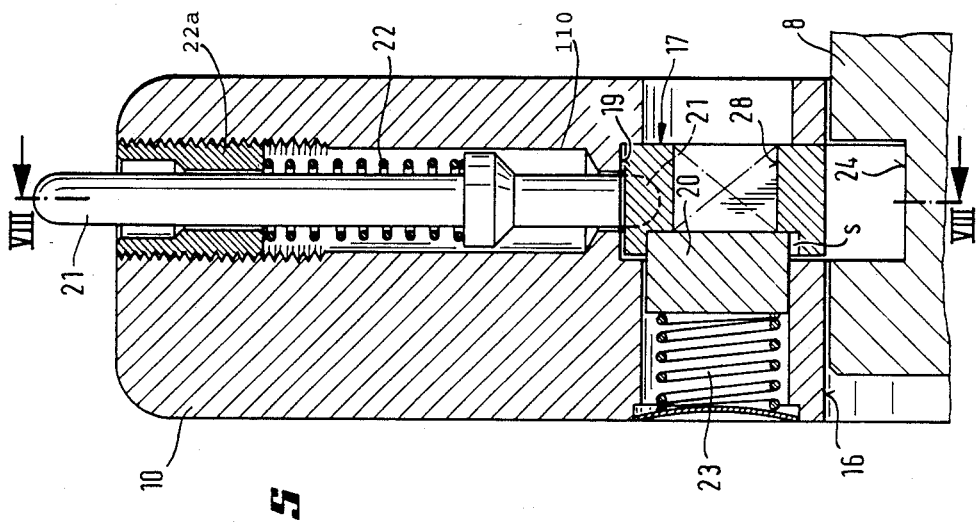

TORQUE TRANSMITTING COUPLING FOR REELS AND THE LIKE

BACKGROUND OF THE INVENTION

The invention relates to couplings in general, and more particularly to improvements of couplings which can be resorted to for transmission of torque from a rotary driving member to a rotary driven member which should be detachable from the driving member. Couplings of such character are disclosed in numerous patents of the assignee of the present application including U.S. Pat. Nos. 4,344,304, 4,362,412, 4,406,029, 4,460,134, 4,551,117, 4,681,478 and 4,758,113. One presently preferred use of couplings of the type to which the present invention pertains is to transmit torque between a motor-driven shaft and the mandrel for a reel in a machine for winding or unwinding webs of paper, textile material, metallic foil, plastic foil or the like.

The aforementioned U.S. Pat. No. 4,551,117 discloses a coupling wherein a wheel which is movably mounted on the end portion of a motor-driven shaft must be pivoted from an operative to an inoperative position in order to permit withdrawal of the end portion of a reel-supporting mandrel from its socket in the wheel. The wheel is pivotable about an axis which extends at right angles to and is spaced apart from the axis of the motor-driven shaft. Reference may also be had to German Pat. No. 917,592 which discloses that the socket in the pivotable wheel can be surrounded by a polygonal surface having a square outline which is complementary to the outline of the polygonal external surface of the end portion of the driven member. This ensures that the coupling of the German patent is ready to transmit torque from the driving member to the driven member as soon as the wheel reassumes its operative position. A drawback of such proposal is that the socket cannot receive the end portion of the driven member with a minimum of clearance so that the end portion is likely to wobble in its socket, especially if the driven member is to be rotated at a high speed or at a very high speed. Moreover, heretofore known couplings cannot prevent excessive bending of the driven member, especially at elevated speeds, not only because of excessive play between the end portion of the driven member and the surface surrounding the socket in the pivotable wheel on the end portion of the driving member but also because the end portion of the driven member is relatively short. This is due to the fact that the provision of a socket in the pivotable wheel imposes limits upon the depth of the socket (as measured in the axial direction of the driven member). The situation is aggravated as the wear upon the parts of the coupling increases after extended periods of use and repeated insertion of the end portion of the driven member into and withdrawal of such end portion from the socket in the wheel.

The aforementioned commonly owned U.S. Pat. No. 4,362,412 proposes to overcome the drawbacks of the coupling which is disclosed in German patent No. 917,592 by the provision of an insert which defines the socket and is made of a highly wear-resistant material. In addition, the insert is removably installed in the coupling so that it can be replaced after a certain period of use. Such proposal constitutes a substantial improvement insofar as the useful life of the coupling is concerned. However, the axial length of the socket for the end portion of the driven member is still relatively short in order to permit the wheel to pivot between the operative and inoperative positions. This imposes limits upon the magnitude of bending and/or other stresses which can be successfully resisted by the coupling, particularly by the end portion of the driven member. Excessive stressing of the driven member entails pronounced bending which causes the driven member to run out of true and to bring about excessive wear upon the end portion of the driven member as well as on other parts of the coupling. Therefore, even a renewed and rather frequent replacement of the aforementioned insert with a fresh insert cannot prevent premature destruction of the entire coupling. The wear upon the coupling which is disclosed in U.S. Pat. No. 4,362,412 is especially pronounced when the driven member must be rotated at a very high speed such as is expected in a modern web winding or unwinding machine. The only acceptable alternative is to reduce the RPM of the driving member and to thus limit the output of the machine.

OBJECTS OF THE INVENTION

An object of the invention is to provide a coupling wherein the end portion of the driven member is less likely to perform stray movements than in heretofore known couplings.

Another object of the invention is to provide a coupling wherein the end portion of the driven member can stand more pronounced axial and/or radial stresses than in heretofore known couplings.

A further object of the invention is to provide a coupling whose useful life is longer than that of conventional couplings and which can be used in winding, unwinding and like machines wherein the driven member must be rotated at a very high RPM.

An additional object of the invention is to provide the driving member of the above outlined coupling with a novel and improved end portion which receives and transmits torque to the end portion of the driven member.

Still another object of the invention is to provide the coupling with novel and improved means for transmitting torque between the driving and driven members.

A further object of the invention is to provide the coupling with novel and improved means for indicating the condition of the coupling, especially the condition or position of the part or parts which lock the end portion of the driven member in a socket of the end portion of the driving member.

Another object of the invention is to provide a coupling which is designed in such a way that the part which must be opened in order to afford access to the socket for the end portion of the driven member is automatically moved to an optimum position for movement to a fully open position as soon as the operator completes pivoting of the wheel on the end portion of the driving member to its inoperative position.

An additional object of the invention is to provide a coupling whose useful life exceeds the useful lives of heretofore known couplings which are used to drive mandrels and like driven members in machines for winding or unwinding webs or strips of paper, textile material, metallic foil, plastic foil or the like.

Another object of the invention is to provide a coupling wherein the socket in the end portion of the driving member can confine a long end portion of the driven member.

A further object of the invention is to provide a coupling wherein the useful life of the insert which defines a socket for the end portion of the driven member is much longer than the useful life of conventional inserts even though the insert of the improved coupling need not be made of a highly wear resistant material.

Another object of the invention is to provide a novel and improved method of confining the end portion of the driven member in a socket which is defined by the end portion of the driving member in a coupling for use in winding, unwinding and like machines.

SUMMARY OF THE INVENTION

The invention is embodied in a coupling which comprises a driving member including a sleeve which defines a socket having a lateral inlet, a gate which is movable between open and closed positions in which the inlet is respectively accessible and blocked, and a wheel which is pivotable between operative and inoperative positions in which the gate is respectively maintained in and is movable to and from closed positions. The sleeve and the socket extend axially beyond the wheel in the operative position of the wheel, and the coupling further comprises a driven member having an end portion which is insertable into and removable from the socket by way of the lateral inlet in the open position of the gate. The coupling further comprises a bearing for the driving member at one side of the wheel, and the socket extends beyond the other side of the wheel. The latter is pivotable about an axis which is normal to and is spaced apart from the axis of rotation of the driving member. The depth of the socket in the axial direction of the driving member exceeds the axial length of the wheel. The coupling further comprises means for movably connecting the gate to the sleeve. The sleeve has first and second end portions which flank the inlet of the socket, and the connecting means comprises means for pivotably mounting the gate on one end portion of the sleeve. Such mounting means is preferably detachable from the one end portion of the sleeve and is connectable to the other end portion. To this end, each end portion of the sleeve can be provided with a hole, and the connecting means can comprise a pintle which is received in either of the two holes. Such pintle can include a dowel pin.

The driving member further comprises a component which is disposed at the one side of the wheel and pivotably supports the wheel. Such coupling also comprises fastener means for removably securing the sleeve to the component in either of two positions at 180 degrees relative to each other.

The coupling further comprises means for transmitting torque between the sleeve and the end portion of the driven member, and such torque transmitting means can comprise a torque transmitting element a first portion of which extends into a groove of the sleeve and a second portion of which extends into a groove of the end portion of the driven member.

The end portion of the driven member can have a cylindrical peripheral surface, and the sleeve and the gate can jointly define a second cylindrical surface which is complementary to and surrounds the peripheral surface of the end portion in the closed position of the gate.

The wheel can include means for urging the gate to the closed position in the operative position of the wheel. Such urging means can include a portion of the internal surface of the wheel. In addition, or in lieu of such portion of the internal surface, the urging means can comprise a biasing member which is provided in the wheel. Such biasing member can comprise or constitute an eccentric which is rotatably mounted in the wheel and has a lobe movable into and from engagement with the gate when the latter assumes the closed position. The eccentric can include or constitute a disc cam which is movable into and from self-locking engagement with the gate. The eccentricity of the lobe is preferably selected in such a way that it exceeds the play with which the eccentric is rotatable on a mounting means in or on the wheel. The mounting means can include a cylindrical insert in the wheel. The gate can be provided with a recess which receives the lobe of the eccentric in a predetermined angular position of the eccentric with reference to the wheel. The gate includes a bottom surface in the recess, and the lobe preferably bears against such bottom surface to lock the eccentric in the predetermined angular position of the eccentric with reference to the wheel. Such coupling can further comprise means for indicating the angular position of the eccentric relative to the wheel, and the indicating means can comprise a pin which is movably mounted in the wheel and a portion of which extends from the wheel when the lobe is disengaged from the gate. The indicating means can further comprise first resilient means for yieldably biasing the pin against the eccentric with a first force, and the coupling preferably further comprises second resilient means for biasing the eccentric against the wheel with a second force which is greater than the first force so that the first resilient means cannot cause the pin to change the angular position of the eccentric.

The gate and the other end portion of the sleeve can define a small clearance in the closed position of the gate; this ensures that the gate can bear directly against the end portion of the driven member when the gate is closed and the wheel assumes the operative position.

The sleeve and/or the gate preferably includes a first detent member, and the end portion of the driven member then includes a second detent member which cooperates with the first detent member to hold the end portion of the driven member against axial movement relative to the driving member in the closed position of the gate. One of the detent members can include a bead and the other detent member then comprises a recess for the bead. The detent members can be provided at that side of the wheel which is remote from the bearing for the driving member.

The aforementioned torque transmitting element can comprise a cylindrical stud which is parallel to the axis of the driving member and includes a major first portion which is recessed into the sleeve and a minor second portion which is recessed into the end portion of the driven member. The stud is preferably insertable into and extractible from the sleeve so that the latter can be inserted into or withdrawn from the wheel in either of two different positions. The aforementioned component of the driving member can be provided with a hole or bore for a portion of the stud. The length of the stud preferably exceeds the length of the sleeve in the axial direction of the driving member, and such stud is preferably disposed substantially diametrically opposite the inlet of the socket.

The coupling can further comprise means for yieldably urging the gate to a partly open position. Such urging means can comprise at least one spring which serves to move the gate from the closed position to the partly open position in response to pivoting of the wheel from the operative position. The extent of movement of the gate from closed to partly open position is preferably a small fraction of the extent of movement of the gate from the closed to open position. In accordance with a presently preferred embodiment, that end face of the gate which confronts the other end portion of the sleeve in the closed position of the gate has a blind bore or hole for the aforementioned spring of the urging means and for a stop which is biased by the spring so that it bears against the other end portion of the sleeve when the gate assumes its closed position. Thus, when the wheel is pivoted from the operative position, the spring is free to shift the stop relative to the gate and to thus move the gate to the partly open position. The gate can be provided with a cam face which is engaged by a portion of the internal surface of the wheel when the latter is pivoted to its operative position so that the wheel then moves the gate from the partly open to the closed position. The distance through which the gate moves between partly open and closed positions is preferably less than the extent to which the cam face extends radially of the driving member; this ensures that the cam face is invariably located in the path of movement of a portion of the internal surface of the wheel when the gate is held in the partly open position and the wheel is in the process of moving from the inoperative to operative position.

The novel features which are considered as characteristic of the invention are set forth in particular in the appended claims. The improved coupling itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 5 is an enlarged fragmentary axial sectional view of the wheel, the eccentric being shown in retracted position and the pin of the indicating means being shown in exposed position;

FIG. 6 shows the structure of FIG. 5, with the eccentric in extended position and the pin of the indicating means in concealed position;

DESCRIPTION OF PREFERRED EMBODIMENTS

The coupling 1 which is shown in FIGS. 1 to 8 comprises a rotary driving member 3 which receives torque from a motor, not shown, and a rotary driven member 2. The driven member 2 can constitute or form part of a mandrel for a winding or unwinding reel (not shown). The coupling 1 can be used in machines for winding or unwinding webs of paper, metallic or plastic foil, textile material or the like.

Figure 2:
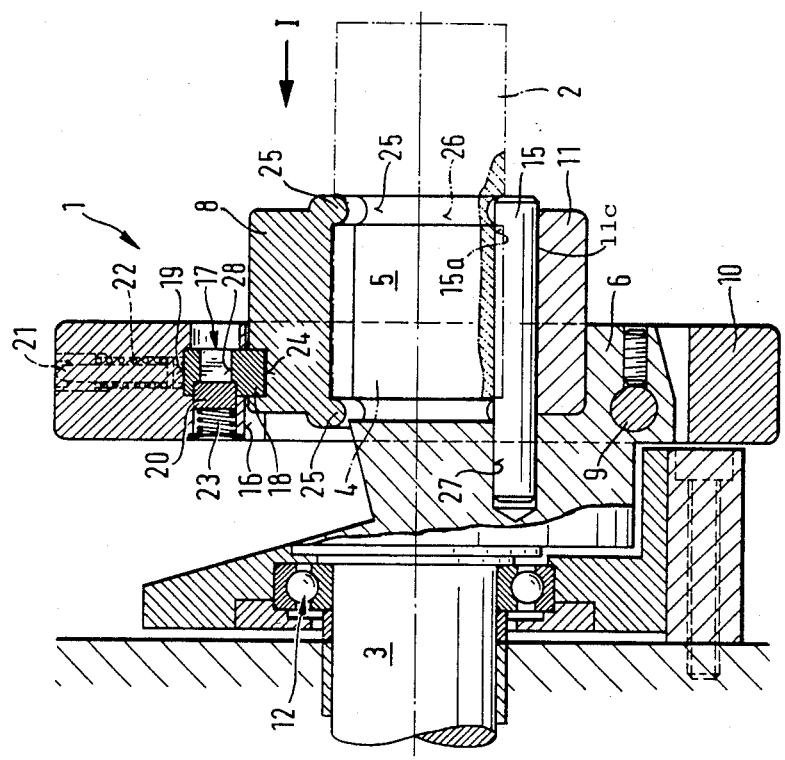
FIG. 2 an axial sectional view of the coupling of FIG. 1, with the driven member indicated by broken lines.
Figure 3:
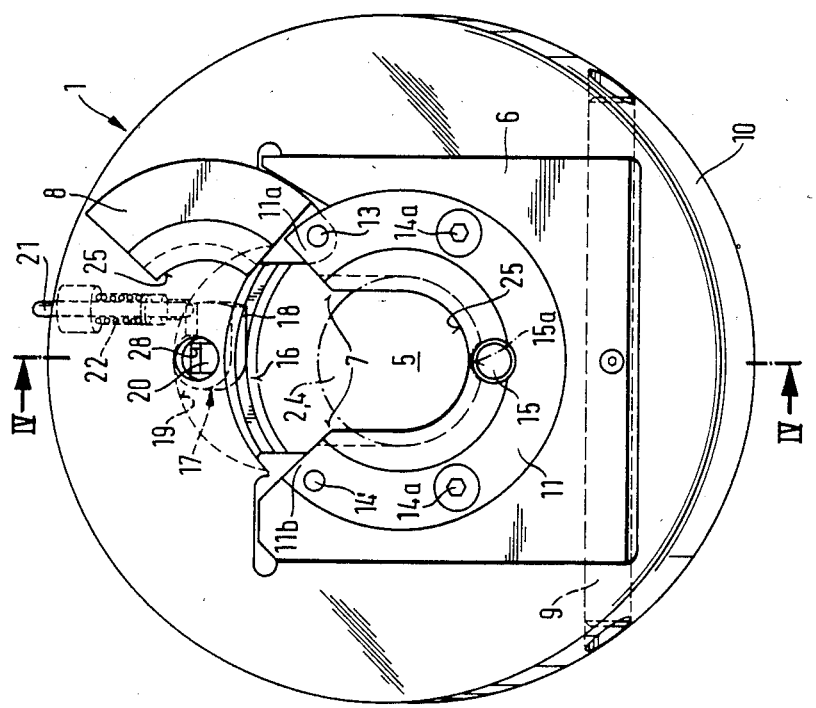
FIG. 3 is a front elevational view similar to that of FIG. 1 but with the wheel in the inoperative position and the in open position.

FIG. 2 shows the end portion 4 of the driven member 2 in a socket or recess 5 (FIG. 1) of the end portion of the driving member 3. The socket 5 has a lateral inlet 7 (FIG. 3) which permits insertion of the end portion 4 of the driven member 2 (hereinafter called mandrel for short) at right angles to the axis of the driving member 3 (hereinafter called shaft), i.e., from above as seen in FIG. 3. The inlet 7 can be exposed or closed by a gate or closure 8 which is movably mounted on the end portion of the shaft 3. When the end portion 4 is formlockingly received in the socket 5, it is in torque receiving or transmitting engagement with the end portion of the shaft 3 so that the latter can rotate the mandrel 2 in either direction or vice versa. It is assumed here that the shaft 3 is driven to transmit torque to the mandrel 2.

Figure 1:
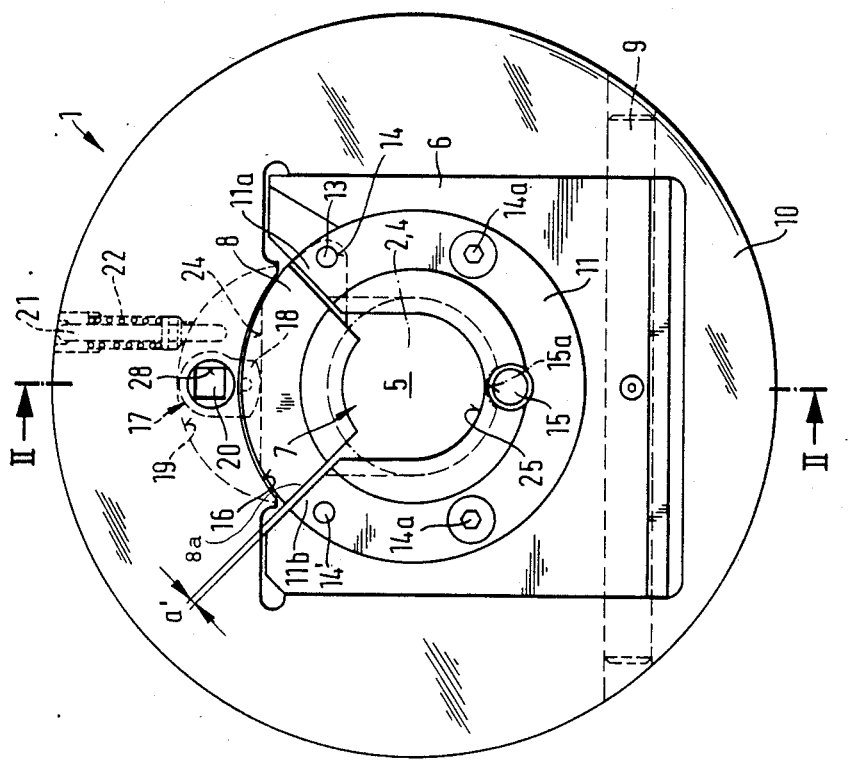
FIG. 1 is a front elevational view of one embodiment of the improved coupling, the driven member being omitted and the wheel being shown in the operative position.
Figure 4:
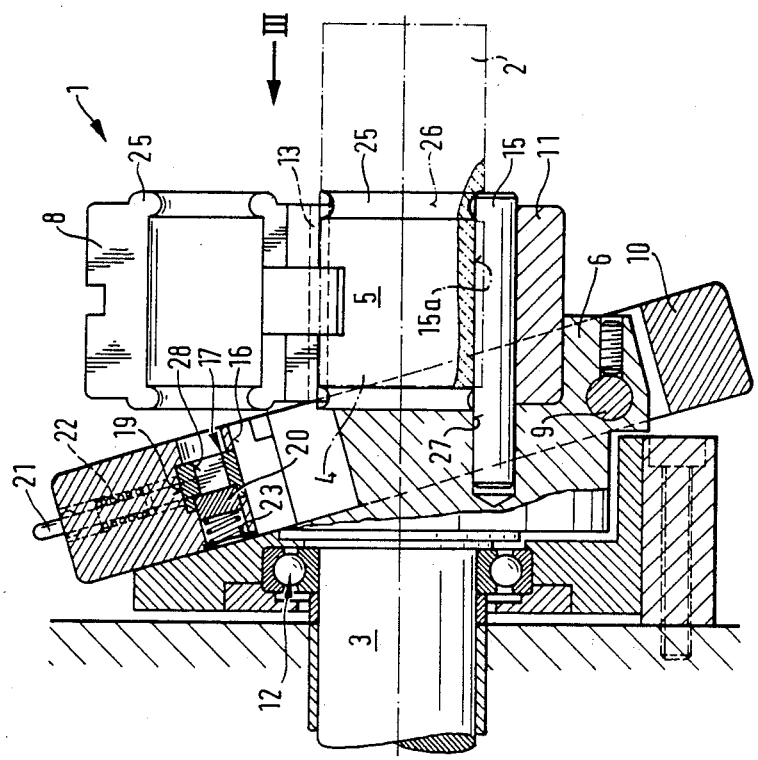
FIG. 4 is an axial sectional view of the coupling of FIG. 3, with the driven member indicated by broken lines.

The end portion of the shaft 3 comprises a first component 6 which is rotatably mounted on a bearing 12 in the frame of the winding or unwinding machine and carries a transversely extending pivot member 9 for a second component 10 in the form of a hand wheel pivotable between the operative position of FIGS. 1 and 2 in which it prevents access to the gate 8 and the inoperative position of FIGS. 3-4 in which the gate 8 is accessible and can be moved to open position (FIG. 3) so that the end portion 4 of the mandrel 2 can be inserted into or withdrawn from the socket 5. Still further, the end portion of the shaft 3 comprises a third component 11 which is partially surrounded by the wheel 10 in the operative position on the wheel as shown in FIGS. 1 and 2. The socket 5 is defined by the component 11 which can be said to resemble a sleeve and carries the gate 8 so that the latter can be pivoted between the closed position of FIG. 1 and the open position of FIG. 3. Thus, in order to permit removal of end portion 4 from the socket 5, it is necessary to pivot the wheel 10 about the axis of the pivot member 9 from the position of FIGS. 1-2 to the position of FIGS. 3-4 and to thereupon pivot the gate 8 from the closed position of FIGS. 1-2 to the open position of FIGS. 3-4.

FIG. 2 shows that the component 11 (hereinafter called sleeve) and the gate 8 extend axially of the shaft 3 and mandrel 2 well beyond the wheel 10 in a direction away from the bearing 12 for the component 6. Furthermore, the axial length of the circumferentially complete body including the sleeve 11 and the gate 8 (in the closed position of the gate) exceeds the axial length of the wheel 10. This is desirable and advantageous because the socket 5 is provided in the sleeve 11 and, therefore, the axial length of the socket can appreciably exceed the axial length of the wheel 10. Thus the coupling 1 can resist flexing of the end portion 4 and of the adjacent part of the mandrel 2 with a force which is much greater than if the socket 5 were provided directly in the wheel 10 or in a part which is pivotable with the wheel (reference may be had, for example, to commonly owned U.S. Pat. Nos. 4,551,117, 4,460,134, 4,344,3044, 4,681,478 and 4,758,113. Such greater resistance to flexing of the mandrel 2 can be achieved without unduly increasing the dimensions of the wheel 10. The pivot 9 extends at right angles to the common axis of the mandrel 2 and shaft 3 and is provided in the component 6, the same as the sleeve 11. The dimensions of the wheel 10 can be reduced or need not be increased in comparison with the wheels of heretofore known couplings because the socket 5 and/or the inlet 7 of the socket is not defined directly by the wheel but rather by the sleeve 11 and by the gate 8. Otherwise stated, the inlet 7 of the socket 5 is not or need not be closed directly by the wheel 10 but rather by the gate 8 before the wheel is returned to the operative position of FIGS. 1-2. Thus, the wheel 10 can be said to constitute a second or outer gate or closure for the inlet 7 of the socket 5.

The socket 5 preferably extends close to that end face of the wheel 10 which confronts the bearing 12 for the shaft 3 and component 6; this ensures that the end portion 4 of the mandrel 2 can be confined in its socket all the way from the right-hand axial end of the sleeve 11 to the left-hand axial end of the wheel 10 (as seen in FIG. 1). An end portion 4 of such considerable axial length can readily withstand pronounced bending stresses because the axial length or depth of the socket 5 considerably exceeds the axial length of the wheel 10. This reduces the likelihood of vibration and other stray movements which could lead to pronounced wear upon the parts of the coupling 1, to generation of excessive noise and to other undesirable phenomena. Moreover, the maximum bending stresses which can be withstood by the improved coupling 1 and into parts are much greater than those which can be safely taken up by heretofore known couplings.

The inlet 7 to the socket 5 is flanked by two end portions 11a and 11b of the sleeve 11. The end portion 11a has an axially parallel bore or hole 14 for a pivot member 13 (hereinafter called pintle) which movably connects the gate 8 to the sleeve 11 for pivotal movement between the open position of FIG. 3 and the closed position of FIG. 1. The pintle 13 is preferably extractible from the hole or bore 14 so that it can be inserted (if necessary) into a similar hole or bore 14' in the end portion 11b of the sleeve 11. The pintle 13 can constitute or resemble a dowel pin. The provision of holes or bores 14, 14' in both end portions 11a, 11b of the sleeve 11 contributes to versatility of the coupling 1. Thus, this coupling can be used at the left-hand end of the mandrel 2 (as shown in FIGS. 2 and 4) or at the other end of the mandrel. This will be readily appreciated by looking at FIGS. 1, 2 and 3 in commonly owned U.S. Pat. No. 4,460,134. Thus, all that is necessary to convert the coupling 1 for use at the other end of the mandrel 2 is to withdraw the pintle 13 from the hole or bore 14, to turn the gate 8 around and to attach the gate to the end portion 11b of the sleeve 11 by inserting the pintle 13 into the hole or bore 14'.

The sleeve 11 is removably installed in the component 6 of the end portion of the shaft 3 by screws 14a or other suitable fasteners so that it can be turned through 180 degrees with reference to the position which is shown in FIGS. 2 and 4. The fasteners 14a are parallel to the common axis of the shaft 3 and mandrel 2. Such design ensures that the sleeve 11 can be used at the other axial end of the mandrel 3 by the simple expedient of removing the fasteners 14a, removing the sleeve 11 from the component 6, turning the sleeve through 180 degrees, reinserting the sleeve into the component 6, and applying the fasteners 14a. The axially parallel holes or bores which are provided in the sleeve 11 for the fasteners 14a are preferably provided with larger-diameter end portions so that they can receive and confine the heads of the fasteners.

The end portion 4 of the mandrel 2 can have a polygonal outline, and the surface bounding the socket 5 in the sleeve 11 can have a complementary polygonal outline to thus ensure that a form-locking connection between the end portion 4 and the sleeve 11 is established as soon as the end portion 4 enters the socket 5. However, it is often preferred to use a cylindrical end portion 4 and to provide the sleeve 11 with a cylindrical internal surface which surrounds the socket 5. Such configuration of the end portion 4 and of the sleeve 11 ensures that the end portion 4 can be received in the socket 5 with a minimum of play as well as that the peripheral surface of the end portion 4 and the internal surface of the sleeve 11 can be machined with a high degree of precision and at a reasonable cost in readily available machines. The curvature of the inner side of the gate 8 (i.e., the curvature of that surface of this gate which is immediately adjacent the peripheral surface of the properly inserted end portion 4) preferably matches that of the internal surface of the sleeve 11 so that the sleeve and the gate jointly define a circumferentially complete or nearly complete internal cylindrical surface which surrounds the cylindrical peripheral surface of the end portion 4.

The means for transmitting torque between the cylindrical end portion 4 and the sleeve 11 when the latter has a complementary cylindrical internal surface can include one or more torque transmitting elements in the form of wedges or the like. A presently preferred torque transmitting element is a cylindrical stud 15 an end portion of which is anchored in a blind bore or hole 27 of the component 6 and a portion of which extends into a complementary axially parallel peripheral groove 15a of the end portion 4. Alternatively or in addition to the illustrates stud shaped torque transmitting element 15, the means for transmitting torque between the shaft 3 and the mandrel 2 can include one or more elements which transmit torque directly between the sleeve 11 and the end portion 4 (rather than between the component 6 and the end portion 4).

The mounting of the cylindrical stud 15 in the component 6 and the depth of the groove 15a in the peripheral surface of the end portion 4 are such that the major portion of the stud 15 is received in the end portion (including the parts 6, 8, 10 and 11) of the shaft 3. In fact, only a very small portion of the stud 15 projects into the socket 5. Such small portion suffices to transmit torque between the shaft 3 and the mandrel 2 as well as to maintain the end portion 4 in a predetermined angular position relative to the sleeve 11 when the gate 8 is permitted or caused to assume the closed position of FIG. 1. The left-hand end portion (as seen in FIG. 2 or 4) of the stud 15 can be held (e.g., it can be a press fit) in the blind bore or hole 27 of the component 6 by friction, and the same applies for retention of the stud 15 in the groove 11c of the sleeve 11. This permits convenient extraction of the stud 15. This stud is located substantially diametrically opposite the inlet 7 of the socket 5. Its length exceeds the axial length of the sleeve 11 and its axial position is selected in such a way that the end portion 4 can receive torque from the component 6 as well as from the sleeve 11. In addition, the thus dimensioned and mounted stud 15 establishes a torque transmitting connection between the component 6 and the sleeve 11. In other words, the stud 15 assists the fasteners 14a in transmitting torque from the component 6 to the sleeve 11 when the shaft 3 is driven by a motor or the like, not shown. The illustrated stud 15 has a circular cross-sectional outline; however, it is equally possible to employ a stud having a polygonal or other cross-sectional outline. Still further, it is possible to employ two or more studs 15 each of which extends into a discrete bore or hole 27 of the component 6, into a discrete groove 11c of the sleeve 11 and into a discrete groove 15a of the end portion 4. Moreover, it is possible to install one of several studs 15, or the single stud, in such a way that it extends in part into a suitably configurated groove in the concave internal surface of the gate 8 when the latter assumes the closed position of FIG. 1. However, if the torque transmitting means comprises a single stud, it is preferred to install such single stud in a manner as shown in FIGS. 2 and 4, namely in that portion of the sleeve 11 which is located diametrically opposite the inlet 7 of the socket 5. This renders it possible to simplify the insertion of the end portion 4 in such a way that the groove 15a receives the adjacent portion of the stud 15 with a minimum of play or with no play at all.

An advantageous feature of the sleeve 11 and gate 8 is shown in FIGS. 2 and 4. These parts are formed with arcuate projections 25 in the form of rounded beads which extend in the circumferential direction of the end portion 4 in the socket 5. These projections can be said to constitute male detent members which are received in complementary female detent members or recesses 26 of the end portion 4 when the gate 8 assumes the closed position of FIG. 1. The purpose of the male and female detent members 25 and 26 is to ensure that the end portion 4 is maintained in a predetermined axial position relative to the end portion of the shaft 3 as soon as the gate 8 is pivoted to the closed position of FIG. 1. This ensures that the mandrel 2 cannot move back and forth toward and away from the shaft 3 when the machine employing the coupling 1 is in actual use. The positions of the male and female detent members can be reversed without departing from the spirit of the invention, i.e., the female detent members 26 or their equivalents can be provided in the sleeve 11 and in the gate 8 to receive male detent members of the end portion 4.

The illustrated sleeve 11 and gate 8 have pairs of male detent members 25, one at that end of the socket 5 which is nearest to the bearing 12 and one at the opposite axial end of the socket. This ensures that the sleeve 11 and the gate 8 can be put to use in orientations which are shown in FIGS. 2 and 4 as well as after turning through angles of 180 degrees.

In order to reduce the likelihood of wobbling, vibrations and other stray movements, the coupling 1 further comprises means for biasing the gate 8 against the end portion 4 of the mandrel 2 when the wheel 10 is maintained in the operative position of FIGS. 1 and 2. Basically, such biasing could be achieved by the internal surface 16 of the wheel 10 by selecting the position and the configuration of the surface 16 in such a way that the wheel 10 bears upon the gate 8 and urges the concave internal surface of the gate against the adjacent portion of the cylindrical peripheral surface of the end portion 4. However, and in order to avoid wobbling of the gate 8 within the wheel 10 after extended periods of use (involving repeated opening and closing of the gate and attendant wear) and/or when the shaft 3 must drive the mandrel 2 at a high or very high speed, the wheel 10 is provided with a discrete biasing or clamping member 17 which is caused to bear upon the gate 8 when the latter assumes the closed position of FIGS. 1-2 and the wheel 10 is held in the operative position of FIGS. 1-2. The clamping member 17 is an eccentric disc which can be said to act not unlike a cam and can be rotated relative to the wheel 10 to thereby move into more or less pronounced frictional and depressing engagement with the gate 8. As can be seen in FIGS. 5 to 8, the clamping member or eccentric 17 has a lobe 18 which can be moved into or out of a recess 24 in the convex external surface of the gate 8. The eccentricity and diameter of the clamping member 17 are selected in such a way that the lobe 18 can be maintained in self-locking engagement with the surface in the bottom region of the recess 24 in the gate 8. The major portion of the clamping member 17 is received in a recess 19 which is provided in the internal surface 16 of the wheel 10. The clamping member 17 is rotatable on a cylindrical insert 20 which is axially movably received in an axially parallel cylindrical bore of the wheel 10 adjacent the internal surface 16. The manner of mounting the clamping member 17 on the insert 20 is such that the clamping member has a certain amount of play (shown at s) in the radial direction of the insert 20. The extent of play s is less than the eccentricity of the clamping member 17. This ensures that, when the lobe 18 does not ear against the surface at the bottom of the recess 24 in the gate 8, the eccentric clamping member 17 can be turned about the axis of the insert 20 with the exertion of a relatively small or minimal effort. This also ensures that eventual wear upon the clamping member 17 and/or upon the adjacent surfaces does not affect its biasing action when the lobe 18 is caused to bear against the gate 8. Still further, such disparity between the plays and eccentricity of the clamping member 17 ensures that the latter can properly bias the gate 8 even if the wheel 10, the clamping member and/or the gate undergoes deformation and/or one or more of these parts are not machined or finished with a maximum degree of precision.

FIG. 5 shows the clamping member 17 in retracted position (i.e., the eccentric lobe 18 does not extend into the recess 24), and FIG. 6 shows the clamping member in extended or active position in which the lobe 18 bears against the surface at the bottom of the recess 24 and ensures that the gate 8 is maintained in closed position such that its concave internal surface constitutes an extension of or complements the internal surface of the sleeve 11 to properly confine the end portion 4 of the mandrel 2 in the socket 5. FIG. 6 further shows that the play s is uniform all the way around the insert 20, i.e., that the width of the clearance between the peripheral surface of the insert 20 and the adjacent internal surface of the clamping member 17 equals s/2 when the lobe 18 is in satisfactory force-locking engagement with the gate 8. In other words, the insert 20 cannot interfere with the clamping action of the lobe 18 upon the gate 8.

In order to ensure that the gate 8 can assume a fully closed position, the radially extending end face 8a of this gate and the end portion 11b of the sleeve 11 define a gap or clearance a' (FIG. 1) so as to enable the lobe 18 to move the gate all the way to such closed position when the clamping member 17 is moved to a predetermined angular position relative to the wheel 10. This gap or clearance a' between the end face 8a and the end portion 11b ensures that the clamping member 17 can bias the gate 8 against the end portion 4 of the mandrel 2 rather than against the end portion 11b of the sleeve 11.

Figure 8:
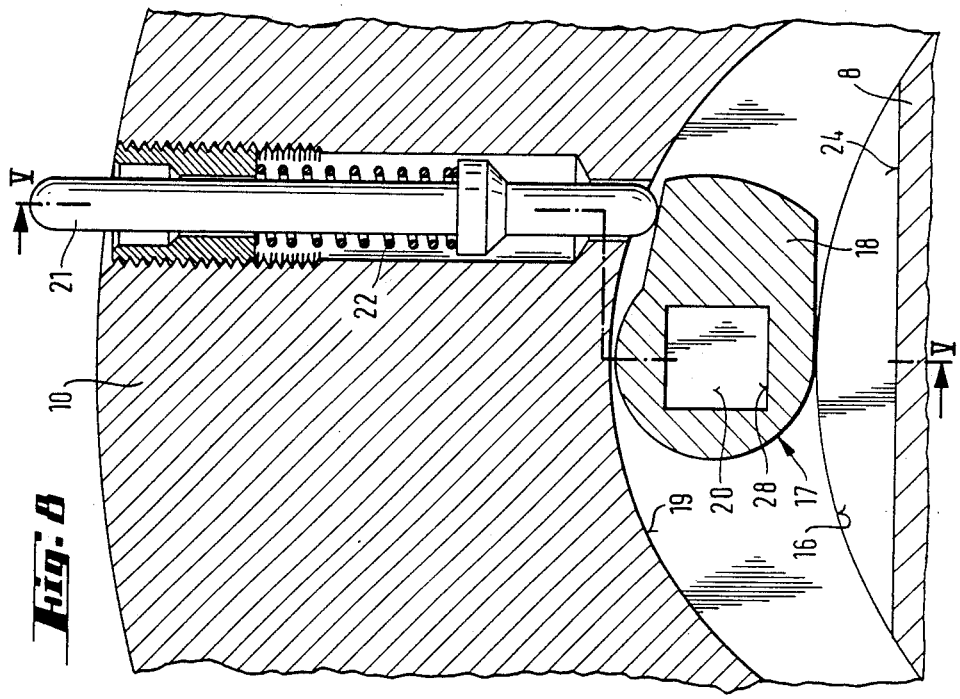
FIG. 8 is a view as seen from the right-hand side of FIG. 5, with a portion of the wheel broken away to expose the pin of the indicating means.
Figure 7:
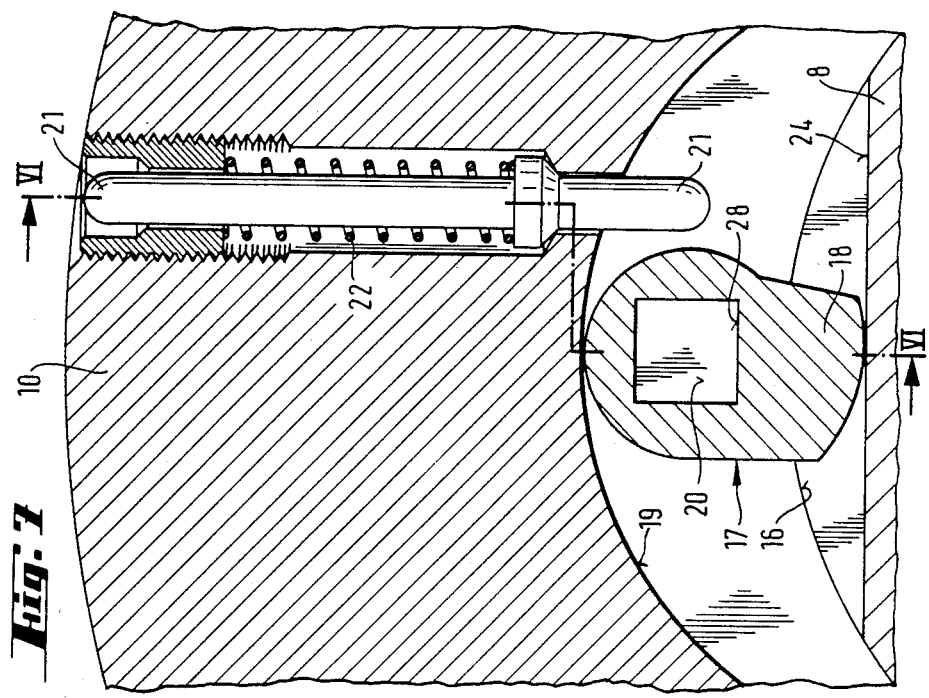
FIG. 7 is a view as seen from the right-hand side of FIG. 6, with a portion of the wheel broken away to expose the pin of the indicating means.

The coupling 1 further comprises means for indicating the angular position of the clamping member 17 relative to the wheel 10. The indicating means comprises an elongated pin-shaped element 21 which is installed in a radial bore 110 of the wheel 10 and is biased radially inwardly toward the internal surface 16 and the clamping member 17 by a prestressed coil spring 22. The latter reacts against a plug 22a which has external threads mating with internal threads in the radially outermost portion of the bore 110, and this spring bears against a collar 21a of the pin 21. When the eccentric lobe 18 of the clamping member 17 extends into the recess 24 of the gate 8, the spring 22 ensures that the radially outermost portion or tip of the pin 21 is confined in the bore 110 (see FIG. 6). When the clamping member 17 is turned about the axis of the insert 20, its peripheral surface causes the pin 21 to move radially outwardly against the opposition of the spring 22 so that the tip of the pin emerges from the bore 110 (FIGS. 5 and 8). In order to ensure that the clamping member 17 will remain in a selected angular position, the insert 20 is biased axially by a coil spring 23 so that it biases the clamping member in a direction toward and against a radially extending internal surface or shoulder 210 of the wheel 10. It is clear that the spring 23 (or another other suitable resilient element or elements) need not bias the clamping member 17 through the medium of the insert 20 but can bear directly against the clamping member to urge it against the internal surface 210. Other friction generating means can be used with equal or similar advantage, as long as they ensure that the clamping member 17 must be turned intentionally in order to move the lobe 18 into or out of the recess 24 in the gate 8. The bias of the coil spring 23 is greater than that of the coil spring 22, i.e., the pin 21 cannot change the angular position of the clamping member 17. Moreover, the spring 23 guarantees that the peripheral surface of the clamping member 17 can maintain the pin 21 in extended or non-concealed position by ensuring that the relatively weak spring 22 can dissipate energy only when the person in charge decides to turn the clamping member 17 in order to move the lobe 18 into or out of the recess 24. The pin 21 signals to the operator that the lobe 18 is or is not received in the recess 24 of the gate 8, i.e., when the tip of the pin 21 is concealed the operator knows that the lobe 18 urges the gate 8 against the end portion 4 of the mandrel 2, and the operator knows that the lobe 18 is extracted from the recess 24 when the tip of the pin 21 projects from the bore 110 of the wheel 10. Of course, the coupling 1 is or can be properly closed and be operative as soon as the wheel 10 is moved to the operative position of FIG. 2; however, the clamping member 17 is preferably moved to the angular position of FIG. 6 before the shaft 3 is caused to transmit torque to the mandrel 2.

The recess 24 constitutes an optional but desirable feature of the coupling 1. Thus, it is possible to omit the recess 24 and have the lobe 18 of the clamping member 17 bear directly against the outer surface of the gate 8 when the gate is to be urged against the end portion 4 in the socket 5. The recess 24 is desirable on the additional ground that the lobe 18 can serve as a means for holding the wheel 10 against pivotal movement from the operative position of FIGS. 1-2 as soon as the lobe enters the recess 24. Thus, the wheel 10 cannot leave its operative position by accident when the coupling 1 is in use, regardless of the magnitude of bending and/or other stresses which develop when the shaft 3 transmits torque to the mandrel 2; pivoting of the wheel 10 to the inoperative position of FIGS. 3-4 must be preceded by rotation of the clamping member 17 so as to extract the lobe 18 from the recess 24. Accidental pivoting of the wheel 10 to the inoperative position of FIGS. 3-4 (e.g., in an elevated RPM of the shaft 3 and mandrel 2) could result in pivoting of the gate 8 to open position and the end portion 4 of the mandrel 2 would then be free to leave the socket 5 while the shaft 3 rotates.

The illustrated clamping member 17 is configurated in such a way that it must be turned thorough approximately or exactly 90 degrees in order to move the lobe 18 into or to withdraw the lobe from the recess 24 of the gate 8. Such angular displacement of the clamping member 17 for the purpose of locking or unlocking the wheel 10 in the operative position of FIGS. 1, 2, 6 and 7 has been found to be highly satisfactory and practical because it does not necessitate an excessive turning of the member 17 and is less likely to lead to errors in manipulation of the improved coupling. Locking or unlocking of the gate 8 can be carried out with little loss in time. The means for facilitating turning the clamping member 17 relative to the wheel 10 comprises a polygonal recess 28 in the exposed end face of the member 17 (see FIGS. 7 and 8). This recess 28 can receive the working end of a simple tool, not shown. Instead of being provided with a polygonal recess, the clamping member 17 can be formed with a slot for the working end of a screwdriver or with a polygonal projection which can be engaged by a suitable wrench or by pliers in order to change the angular position of the clamping member and to thus move the lobe 18 into or from the recess 24 of the gate 8.

An important advantage of the improved coupling 1 is that the end portion 4 of the mandrel 2 can be acted upon by large radial and/or axial forces without affecting the reliability of retention of the end portion 4 in the socket 5. This holds true when the shaft 3 is driven at a relatively low speed as well as when the shaft 3 is driven at a very high RPM. The retaining action of the end portion 6, 8, 10, 11 of the shaft 3 upon the end portion 4 of the mandrel 2 is not dependent upon the axial length of the wheel 10, i.e., the axial length of this wheel can be a relatively small fraction of the depth of the socket 5 (as seen in the axial direction of the shaft 3) without affecting the reliability of the coupling 1 and more particularly the ability of the coupling to properly retain the end portion 4 in the socket 5 while the shaft 3 is driven at any one of a number of different speeds including a very high speed and irrespective of fluctuations of resistance which the mandrel 2 offers to rotation with the shaft. It is clear that the dimensions of the sleeve 11 and gate 8 must be sufficiently large to ensure adequate retention of the end portion 4 in the socket 5.

Another important advantage of the improved coupling 1 is that the mode of manipulating its parts in order to permit insertion of the end portion 4 into or removal of this end portion from the socket 5 is substantially the same as in heretofore known couplings, i.e., it is still necessary to rely on a mode of operation which involves pivoting a wheel about an axis extending at right angles to and being spaced apart from the axis of the driving member in order to afford access to or to prevent removal of the end portion of the driven member from its socket. Such mode of manipulating couplings for mandrels in winding or unwinding machines has been found to be highly satisfactory and practical. All that is necessary is that, in addition to pivoting the wheel 10 between the positions of FIGS. 2 and 4, the gate 8 be pivoted between the open position of FIG. 3 and the closed position of FIG. 1. This additional manipulation is more than warranted in view of the highly improved reliability and stability of the coupling which is achieved by extending the socket 5 axially of the shaft 3 well beyond the axial length of the wheel 10.

A further important advantage of the improved coupling is that the wheel 10 can be pivoted between operative and inoperative positions about the axis of a simple pivot member 9 in the same way as in heretofore known couplings even though the coupling provides a relatively long socket 5 for an equally long end portion 4 of the mandrel 2 so that the latter can be more reliably held against stray movements, such as bending or flexing in response to rotation at an elevated speed and while carrying a relatively heavy load. In other words, the wheel 10 need not perform any complex movements in order to expose the gate 8 for pivoting of the gate to the open position preparatory to insertion of the end portion 4 into or prior to withdrawal of the end portion 4 from the socket 5 by way of the lateral inlet 7. The wheel 10 is required to perform the same simple pivotal movements as in heretofore known couplings.

An additional important advantage of the improved coupling is that, in view of its longer useful life, it is worthwhile to machine its parts with a high degree of precision to thus even further prolong the useful life of the entire coupling. Thus, it pays to ensure that the end portion 4 of the mandrel 2 is received in the socket 5 without any or with minimal play because this further prolongs the useful life of the coupling in addition to a lengthening of the useful life by the provision of a relatively long socket 5 which can extend all the way between the two axial ends of the wheel 10 and also well beyond at least one such axial end.

The feature that the sleeve 11 and the gate 8 can be turned through 180 degrees to be useful in couplings at both ends of a mandrel or a like driven member exhibits numerous important advantages. Not only is the versatility of the coupling enhanced because the coupling can be used at either end of a mandrel, but it is also possible to prolong the useful life of the sleeve 11 and gate 8. Thus, when certain portions of the sleeve 11 and gate 8 have undergone a maximum acceptable amount of wear at one axial end of the mandrel 2, they are inserted into the coupling at the other axial end of the mandrel in positions turned through 180 degrees relative to the illustrated positions so that other (intact) portions of the thus installed sleeve 11 and gate 8 can begin to undergo wear, i.e., the sleeve 11 and gate 8 must be discarded only after they have been used for long periods of time at both ends of the mandrel 2.

The cylindrical stud 15 of the torque transmitting means can be replaced with a wedge-like element or with a stud having a polygonal cross sectional outline. A cylindrical stud is preferred at this time because it can be machined in a simple and inexpensive way and with a high degree of precision. The same holds true for the groves 11c and 15a the former of which receives a major portion and the latter of which receives a minor portion of the stud 15. This ensures that the end portion 4 can be received in the socket 5 with no play at all or with negligible play, at least when the parts of the improved coupling are new, to thus prolong the useful life of the coupling. In addition, a cylindrical stud having a predetermined cross-sectional area is capable of transmitting greater torque than a wedge or a polygonal stud having the same cross-sectional area.

The eccentric clamping or biasing member 17 constitutes an optional but highly desirable feature of the improved coupling. This member ensures that the gate 8 is biased against the adjacent portion of the peripheral surface of the end portion 4 of the mandrel 2 with a force which suffices to further reduce the likelihood of wobbling of the end portion 4 in the socket 5, even after prolonged use of the coupling and after extensive wear upon its parts. The clearance or gap a' ensures that the concave inner side of the gate 8 can bear directly against the end portion 4 in spite of extensive wear as soon as the lobe 18 of the clamping or biasing member 17 engages the surface in the bottom region of the recess 24 in the external surface of the gate. The provision of this clamping or biasing member 17 render it possible to pivot the wheel 10 with the exertion of a small or very small force because the internal surface 16 of the wheel need not perform the function of the lobe 18, i.e., it need not bias the gate 8 against the adjacent part of the properly installed end portion 4. Thus, the wheel 10 can surround the gate 8 with a certain amount of play when these parts assume the positions which are shown in FIGS. 1 and 2 because actual biasing of the gate 8 against the end portion 4 takes place subsequent to pivoting of the wheel 10 to the operative position, namely as a result of rotation of the eccentric clamping or biasing member 17 through about 90 degrees so that the lobe 18 engages the bottom surface in the recess 24 and thereby urges the internal surface of the gate 8 against the end portion 4.

The feature that the eccentricity of the lobe 18 exceeds the maximum play s of the clamping or biasing member 17 relative to the insert 20 ensures that the member 17 automatically assumes an optimum biasing position when it is turned about the axis of the insert 20 so that the lobe 18 enters the recess 24 and engages the bottom surface therein. The member 17 is self-locking, i.e., it is highly unlikely to leave the position of FIG. 6 except if and when rotated by a tool which is introduced into the recess 28. Instead of engaging the bottom surface in the recess 24, the lobe 18 of the member 17 can engage a step or shoulder in the recess or directly in the external surface of the gate 8. As mentioned above, it is preferred to provide a recess 24 because the member 17 then also serves as a means for holding the wheel 10 against movement from the operative position as long as the lobe 18 extends into the recess 24. If the lobe 18 fails to bias the gate 8 against the adjacent portion of the peripheral surface of the end portion 4 in the socket 5, the lobe 18 can still continue to hold the wheel 10 in the operative position and to thus prevent access to the gate 8, as long as a portion of the lobe 18 extends into the recess 24.

Figure 10:
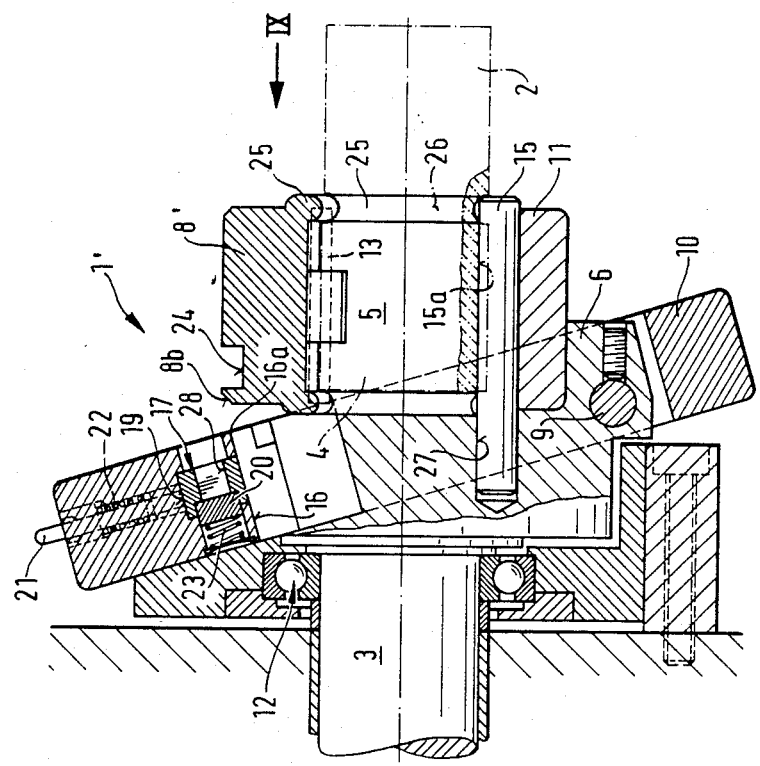
FIG. 10 is an axial sectional view of the modified coupling, the driven member being indicated by broken lines.
Figure 9:
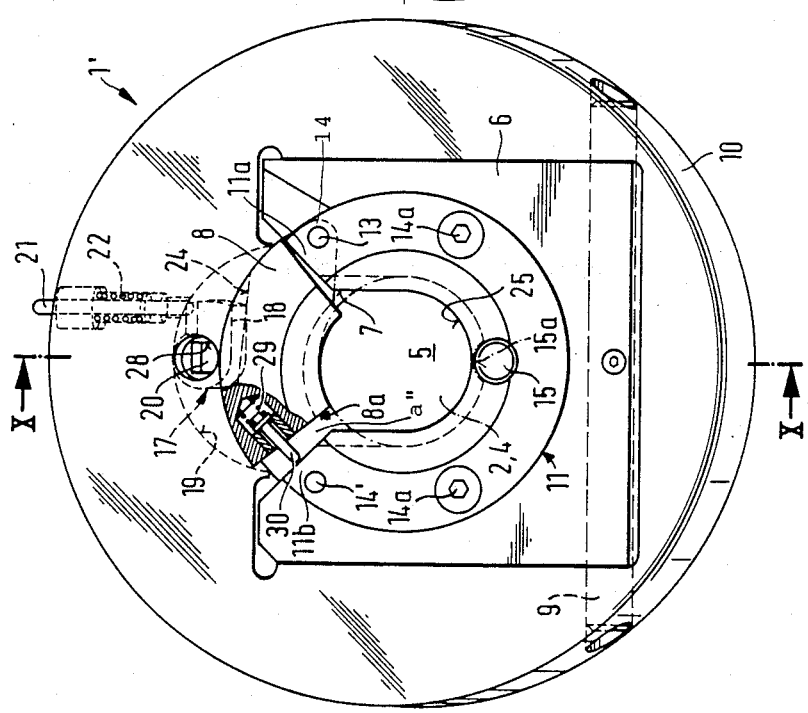
FIG. 9 is a front elevational view of a modified coupling, with the driven member omitted and the wheel shown in inoperative position.

FIGS. 9 and 10 illustrate a modified coupling 1' which has means for urging the gate 8' to a partly open position in response to pivoting of the wheel 10 to the inoperative position which is shown in FIGS. 9 and 10. In all other respects, the coupling 1' is or can be identical with the coupling 1 of FIGS. 1 to 8.

That portion of the gate 8' which is nearest to the bearing 12 for the component 6 of the end portion of the shaft 3 is provided with a cam face 8b which enables the adjacent portion 16a of the internal surface 16 of the wheel 10 to slide over it while the wheel is being pivoted toward the operative position. This results in automatic depression of the gate 8' to the fully closed position in which the concave internal surface of the gate 8' and the internal surface of the sleeve 11 together form a practically circumferentially complete cylindrical internal surface for the end portion 4 of the mandrel 2.

The partly open position of the gate 8' departs only slightly from the closed position in which the end portion 4 of the mandrel 2 is properly confined in the socket 5. The means for urging the gate 8' to the partly open position of FIGS. 9 and 10 includes a yieldable pin-shaped stop 30 which is recessed into the end face 8' the gate 8' and is biased outwardly by a coil spring 29 so that its tip abuts the end portion 11b of the sleeve 11. The spring 29 yields when the portion 16a of the internal surface 16 of the wheel 10 rides over the cam face 8b of the gate 8' so that the gate 8' is pivoted beyond the partly open position of FIGS. 9-10 to the closed position corresponding to that shown in FIG. 1. The extent of angular movement of the gate 8' from the closed position to the partly open position of FIGS. 9-10 can be a relatively small or a very small fraction of the extent of pivotal movement which is necessary to move the gate 8' from the closed position to the fully open position, namely to a position corresponding to that of the gate 8 in FIG. 3 in which the end portion 4 of the mandrel 2 can be inserted into or withdrawn from the socket 5.

The illustrated urging means can be modified in a number of ways. For example, in addition to or in lieu of the spring 29 and stop 30, the urging means can comprise a torsion spring which is convoluted around the pintle 13 and tends to pivot the gate 8' in a clockwise direction (as viewed in FIG. 9). An advantage of the illustrated urging means is that its components 29 and 30 are incorporated in the gate 8' so that the urging means need not be dismantled when the pintle 13 is extracted from its bore or hole 14 to be transferred into the bore or hole 14'.

The cam face 8b of the gate 8' can be flat or convex, as long as it enables the wheel 10 to pivot over the gate 8' during movement from the illustrated inoperative position to the operative position corresponding to that of the wheel 10 which is shown in FIG. 2. The radial dimension of the cam face 8b is preferably greater than the extent of movement of the unattached end of the gate 8' from the closed to the partly open position. This ensures that the portion 16a of the internal surface 16 of the wheel 10 invariably strikes against the cam face 8b when the gate 8' is held in the partly open position of FIGS. 9-10 and the wheel 10 is pivoted toward its operative position The portion 16a of the internal surface 16 of the wheel 10 can be rounded or inclined to even further reduce the likelihood of clashing when the wheel 10 is pivoted toward its operative position, i.e., to even further reduce the likelihood of jamming of the wheel and/or gate 8'It is normally simpler to machine the gate 8', i.e., to provide the gate with a cam face 8b, and to leave the internal surface 16 of the wheel 10 unchanged.

When the wheel 10 is pivoted to the inoperative position of FIGS. 9 and 10, the spring 29 is free to dissipate energy and to propel or push the tip of the stop 30 beyond the end face 8a' of the gate 8' so that the gate is moved to the partly open position and can be more readily pivoted all the way to the fully open position in which the end portion 4 of the mandrel 2 can be removed from the socket 5. The blind bore or hole for the stop 30 and spring 29 in the end face 8a' preferably contains a retaining element (such as a split ring in a groove of the surface bounding the blind bore or hole) which determines the extent to which the tip of the stop 30 can be expelled beyond the end face 8a'. The extent of pivoting of the gate 8' from the closed position to the partly open position of FIGS. 9-10 suffices to ensure that this gate can be properly grasped for pivoting to the fully open position, i.e., the width of the gap a" in FIG. 9 exceeds the width of the gap a' which is shown in FIG. 1.

If the cam face 8b is omitted and no equivalent cam face is provided on the wheel 10, the gate 8' must be manually depressed to the closed position before the wheel 10 is pivoted to the operative position.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A coupling comprising a rotary driving member including a sleeve defining socket having a lateral inlet; a gate movable between open and closed positions in which said inlet is respectively accessible and blocked, and a wheel pivotable between operative and inoperative positions in which said gate is respectively maintained in and is movable to and from said closed position, said sleeve and said socket extending axially beyond said wheel in the operative position of said wheel; and a driven member having an end portion insertable into and removable from said socket by way of said lateral inlet in the open position of said gate.

2. The coupling of claim 1, further comprising a bearing for said driving member at one side of said wheel, said socket extending beyond the other side of said wheel and said wheel being pivotable about an axis which is normal to and is spaced apart from the axis of rotation of said driving member.

3. The coupling of claim 2, wherein the depth of said socket in the axial direction of said driving member exceeds the axial length of said wheel.

4. The coupling of claim 3, further comprising means for movably connecting said gate to said sleeve.

5. The coupling of claim 4, wherein said sleeve has first and second end portions flanking said inlet, said connecting means comprising means for pivotably mounting said gate on one end portion of said sleeve.

6. The coupling of claim 5, wherein said means for pivotably mounting is detachable from said one end portion and is connectable to the other end portion of said sleeve.

7. The coupling of claim 5, wherein each of said end portions of said sleeve has a hole and said connecting means comprises a pintle which is receivable in either of said holes.

8. The coupling of claim 7, wherein said pintle includes a dowel pin.

9. The coupling of claim 3, wherein said driving member further comprises a component which is disposed at said one side of said wheel and pivotably supports said wheel, and further comprising fastener means for removably securing said sleeve to said component in either of two positions at 180 degrees relative to each other.

10. The coupling of claim 3, further comprising means for transmitting torque between said sleeve and the end portion of said driven member.

11. The coupling of claim 10, wherein said torque transmitting means comprises a torque transmitting element, said sleeve having a first groove for a first portion of said element and the end portion of said driven member having a second groove for a second portion of said element.

12. The coupling of claim 3, wherein the end portion of said driven member has a cylindrical peripheral surface and said sleeve and said gate define a second cylindrical surface which is complementary to and surrounds the peripheral surface of said end portion in the closed position of said gate.

13. The coupling of claim 3, wherein said wheel includes means for urging said gate to closed position in the operative position of said wheel.

14. The coupling of claim 13, wherein said wheel has an internal surface an said urging means includes a portion of said internal surface.

15. The coupling of claim 13, wherein said urging means comprises a biasing member provided in said wheel.

16. The coupling of claim 15, wherein said biasing member comprises an eccentric which is rotatably mounted in said wheel and has a lobe movable into and from engagement with said gate.

17. The coupling of claim 16, wherein said eccentric includes a cam which is movable into and from self-locking engagement with said gate.

18. The coupling of claim 16, wherein said lobe has a predetermined eccentricity and further comprising means for mounting said eccentric in said wheel with a predetermined amount of play less than the eccentricity of said lobe.

19. The coupling of claim 18, wherein said mounting means comprises a cylindrical insert in said wheel.

20. The coupling of claim 16, wherein said gate has a recess which receives said lobe in a predetermined angular position of said eccentric with reference of said wheel.

21. The coupling of claim 20, wherein said gate comprises a bottom surface in said recess and said lobe is arranged to bear against said bottom surface to lock the eccentric in said predetermined angular position of said eccentric with reference to said wheel.

22. The coupling of claim 16, further comprising means for indicating the angular position of said eccentric relative to said wheel.

23. The coupling of claim 22, wherein said indicating means includes a pin which is movably mounted in said wheel and a portion of which extends from said wheel when said lobe is disengaged from said gate.

24. The coupling of claim 23, wherein said indicating means further comprises first resilient means for yieldably biasing said pin against said eccentric with a first force and further comprising second resilient means for biasing said eccentric against said wheel with a second force greater than said first force so that said first resilient means cannot change the angular position of said eccentric.

25. The coupling of claim 3, wherein said sleeve includes first and second end portions flanking said inlet and further comprising means for movably connecting said gate to one end portion of said sleeve, said gate and the other end portion of said sleeve defining a clearance in the closed position of said gate.

26. The coupling of claim 3, wherein at least one of the parts including said sleeve and said gate includes a first detent member and the end portion of said driven member comprises a second detent member cooperating with said first detent member to hold said end portion against axial movement relative to said driving member in the closed position of said gate.

27. The coupling of claim 26, wherein one of said detent members comprises a bead and the other of said detent members comprises a recess for said bead.

28. The coupling of claim 26, further comprising a bearing for said driving member at one side of said wheel, said detent members being adjacent the other side of said wheel.

29. The coupling of claim 3, further comprising means for transmitting torque between said driving member and said end portion, said torque transmitting means comprising a cylindrical stud which is parallel to the axis of said driving member and includes a major first portion recessed into said sleeve and a minor second portion recessed into the end portion of said driven member.

30. The coupling of claim 29, wherein said stud is insertable into and extractible from said sleeve.

31. The coupling of claim 29, wherein said driving member further comprises a component which pivotably supports said wheel and has a hole for a portion of said stud.

32. The coupling of claim 29, wherein the length of said stud exceeds the length of said sleeve in the axial direction of said driving member.

33. The coupling of claim 29, wherein said stud is disposed substantially diametrically opposite said inlet.

34. The coupling of claim 3, further comprising means for yieldably urging said gate to a partly open position.

35. The coupling of claim 34, wherein said urging means includes a spring which is arranged to move the gate from closed position in response to pivoting of said wheel from said operative position.

36. The coupling of claim 34, wherein the extent of movement of the gate from said closed to said partly open position is a small fraction of the extent of movement of said gate from closed to open position.

37. The coupling of claim 34, wherein said sleeve includes first and second end portions which flank said inlet, and further comprising means for movably connecting said gate to one of said end portions, said gate having an end face adjacent the other of said end portions in the closed position of said gate and said urging means comprising a stop recessed into and movable relative to said end face and means for yieldably biasing said stop toward said other end portion so that the stop moves the gate to said partly open position under the action of said biasing means in response to pivoting of said wheel from said operative position.

38. The coupling of claim 34, wherein said gate is movable through a predetermined distance between said closed and partly open positions thereof, said gate including a cam face and said wheel having an internal surface which slides over said cam face to thereby move the gate from the partly open to the closed position in response to pivoting of said wheel to said operative position, said cam face extending radially of said driving member through a second distance exceeding said predetermined distance.

39. The coupling of claim 3, wherein said gate includes a cam face and said wheel has an internal surface which slides over said cam face during movement of said wheel to said operative position while said gate assumes or is adjacent said closed position.

* * * * *